United States Patent
Kang

(10) Patent No.: US 12,336,467 B2
(45) Date of Patent: Jun. 24, 2025

(54) TEMPERATURE CONTROL SYSTEM OF A RICE PADDY METHANE FLUX COLLECTING DEVICE

(71) Applicant: KOREA RESEARCH INSTITUTE OF STANDARDS AND SCIENCE, Daejeon (KR)

(72) Inventor: Namgoo Kang, Daejeon (KR)

( * ) Notice: Subject to any disclaimer, the term of this patent is extended or adjusted under 35 U.S.C. 154(b) by 1075 days.

(21) Appl. No.: 17/317,950

(22) Filed: May 12, 2021

(65) Prior Publication Data

US 2021/0378183 A1    Dec. 9, 2021

(51) Int. Cl.
  *A01G 9/24*    (2006.01)
  *A01G 22/22*    (2018.01)
  *G01N 1/22*    (2006.01)

(52) U.S. Cl.
  CPC ............... *A01G 9/24* (2013.01); *A01G 22/22* (2018.02); *G01N 1/2226* (2013.01); *G01N 2001/2241* (2013.01)

(58) Field of Classification Search
  CPC .. A01G 22/22; A01G 9/24; G01N 2001/2241; G01N 1/2226; G01N 1/2294
  USPC .............................................. 73/23.2, 863.01
  See application file for complete search history.

(56) References Cited

FOREIGN PATENT DOCUMENTS

| CN | 103364232 A | * | 10/2013 |
| CN | 203287226 U | * | 11/2013 |
| CN | 203587397 U | * | 5/2014 |
| CN | 110404951 A | * | 11/2019 |
| CN | 110825135 A | * | 2/2020 |
| CN | 112230694 A | * | 1/2021 |
| KR | 20190101253 A | * | 8/2019 |

* cited by examiner

*Primary Examiner* — Daniel S Larkin
*Assistant Examiner* — Nashmiya S Fayyaz

(57) ABSTRACT

The present disclosure provides a temperature control system of a rice paddy methane flux collecting device, which comprises: a chamber body having a collecting space in which a certain number of rice grains are located; a chamber door configured to open and close an upper side of the collecting space; a collecting unit configured to collect a sample gas in the collecting space; a heating unit and a cooling unit configured to increase or decrease the temperature in the collecting space; a circulation unit for circulating the gas in the collecting space; a ventilation unit configured to ventilate the collecting space; an external temperature sensor and an internal temperature sensor for measuring external and internal temperatures of the collecting space; and a temperature controller configured to control the above units to maintain the temperature in the collecting space to be equal to the external temperature.

8 Claims, 8 Drawing Sheets

[FIG. 1]
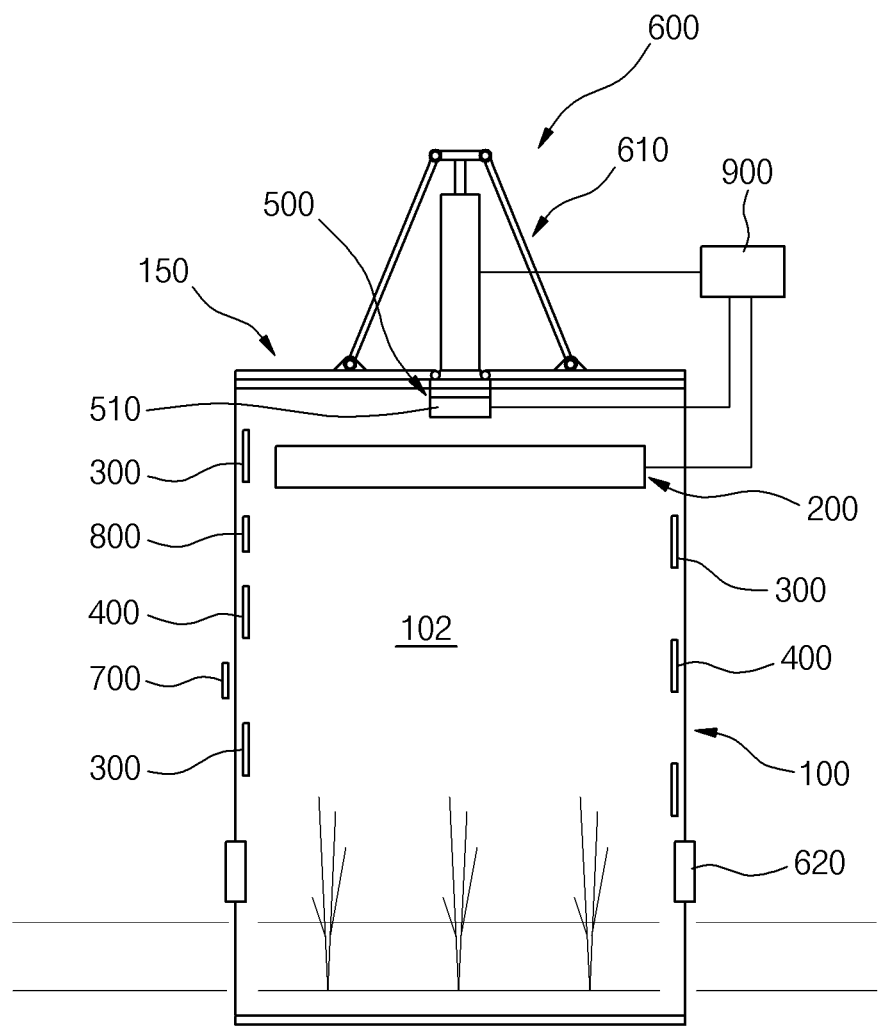

[FIG. 2]
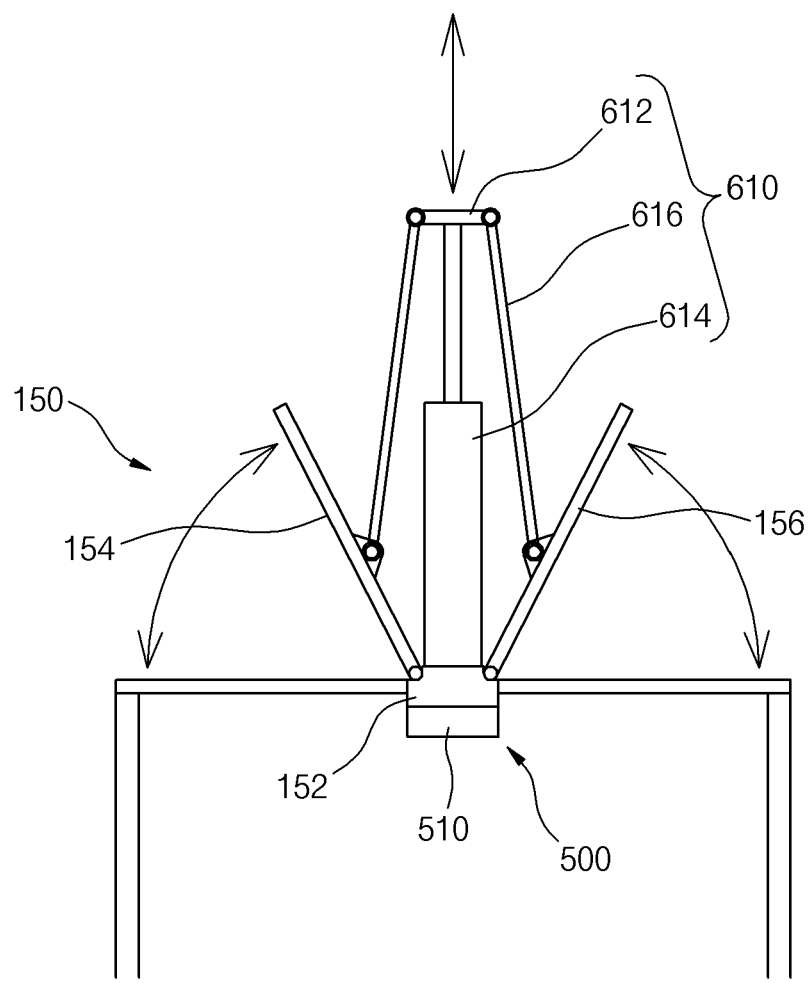

[FIG. 3]
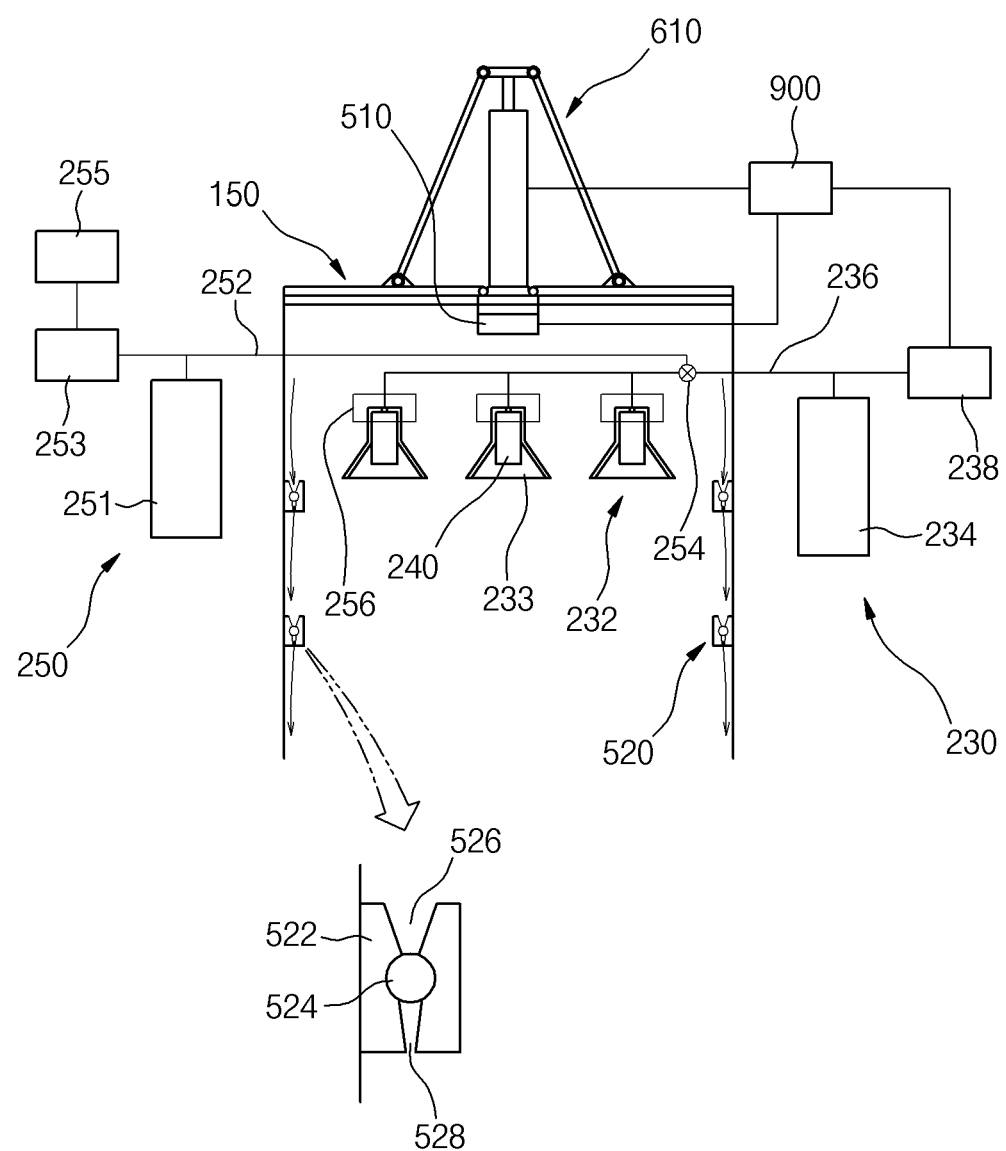

[FIG. 4]
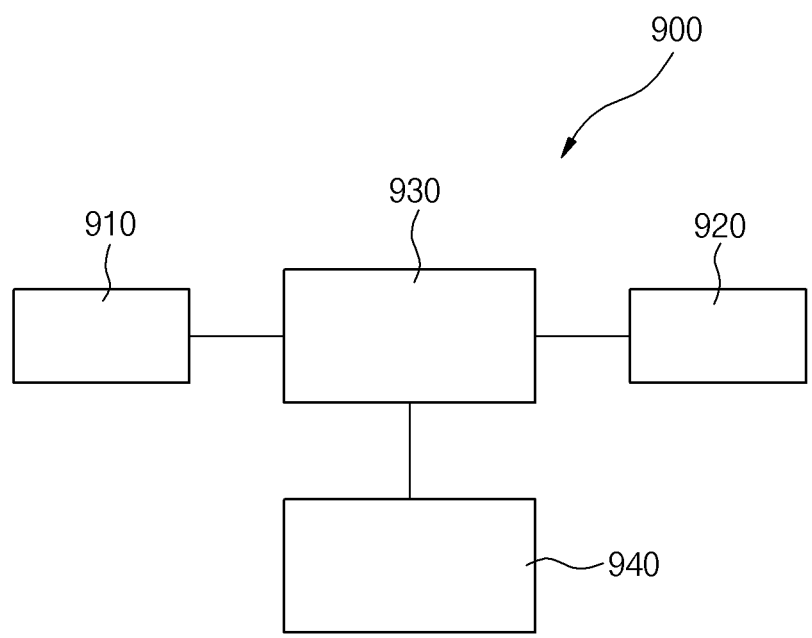

[FIG. 5]
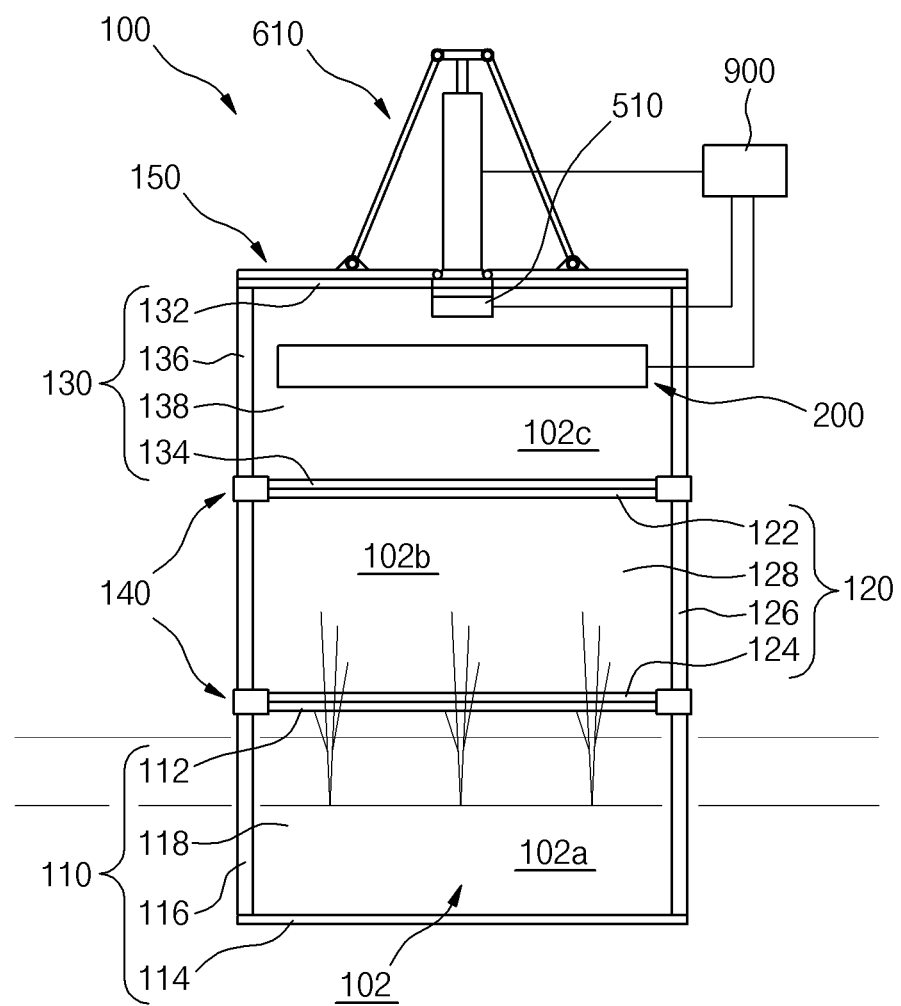

[FIG. 6]
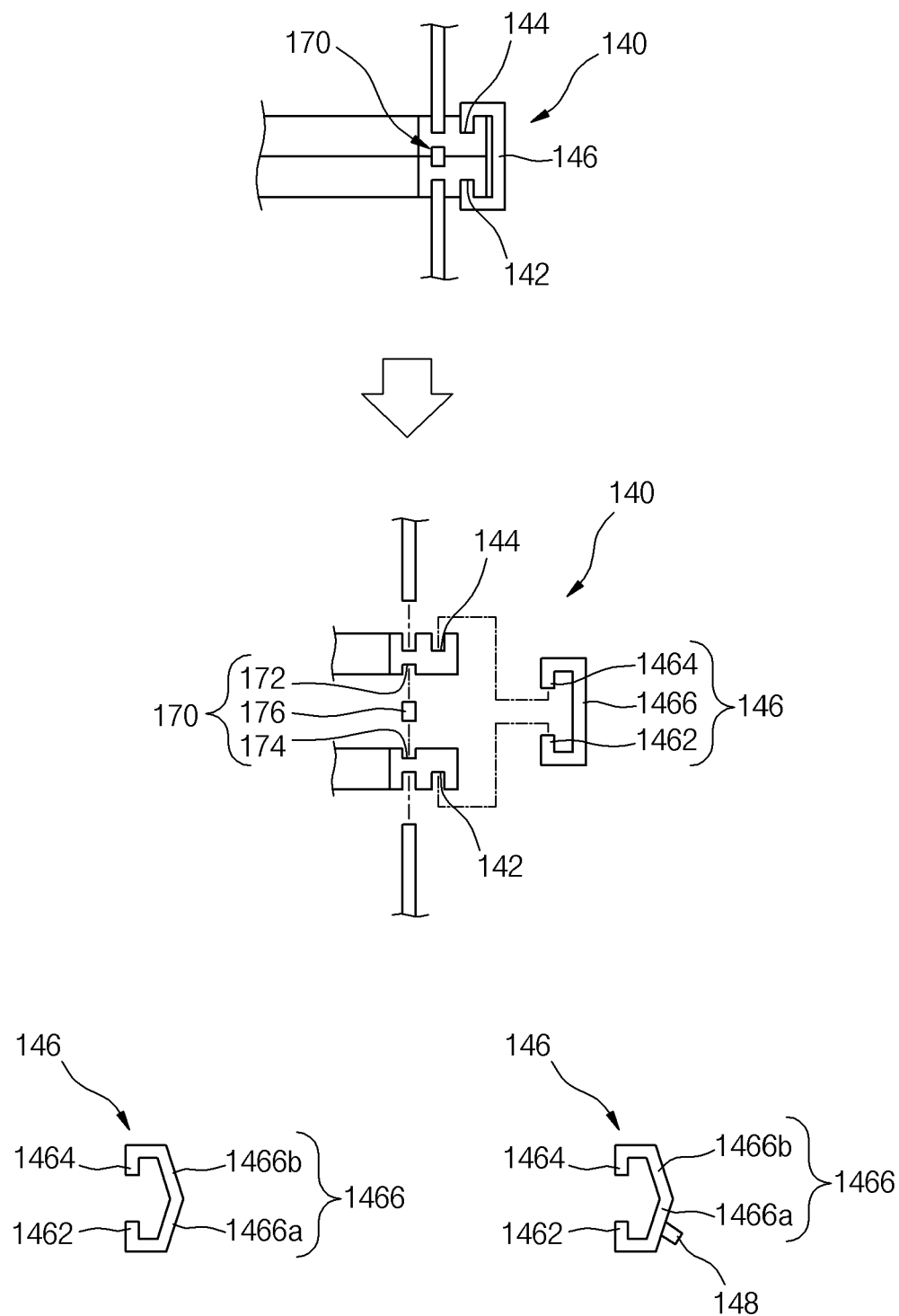

[FIG. 7]
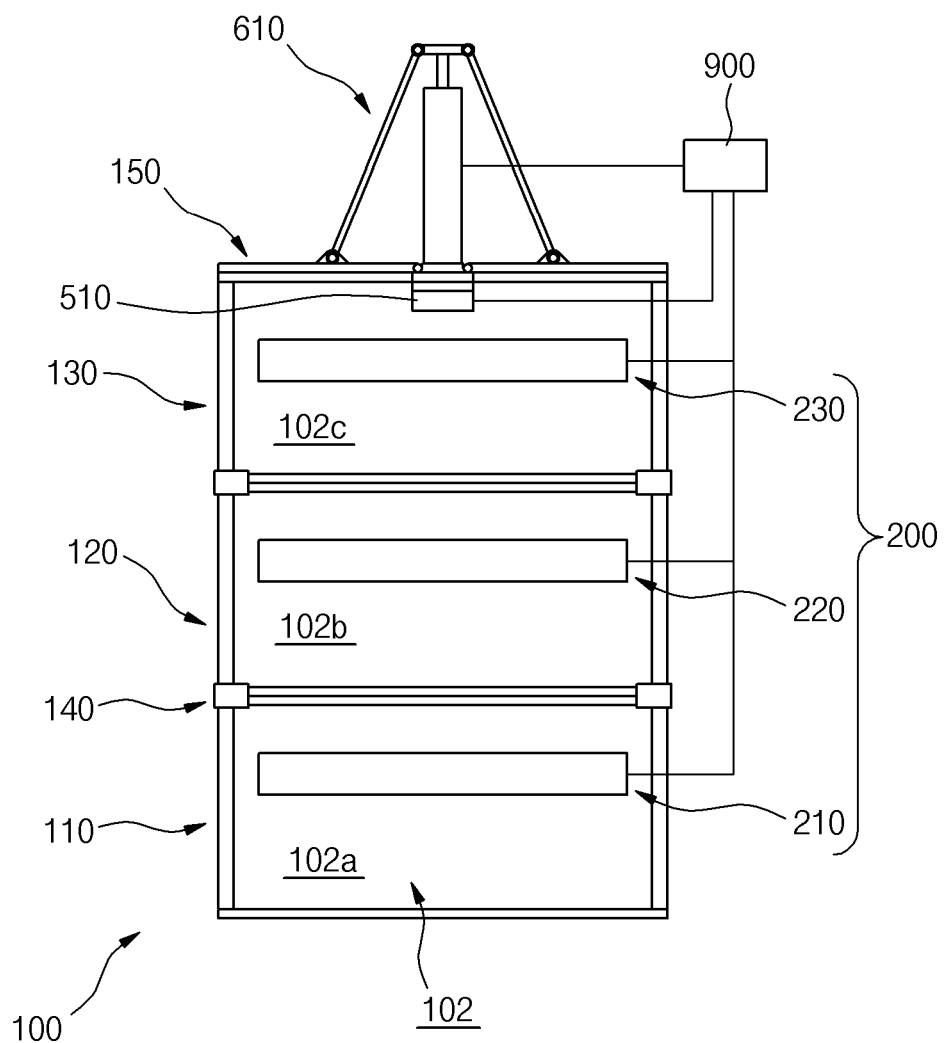

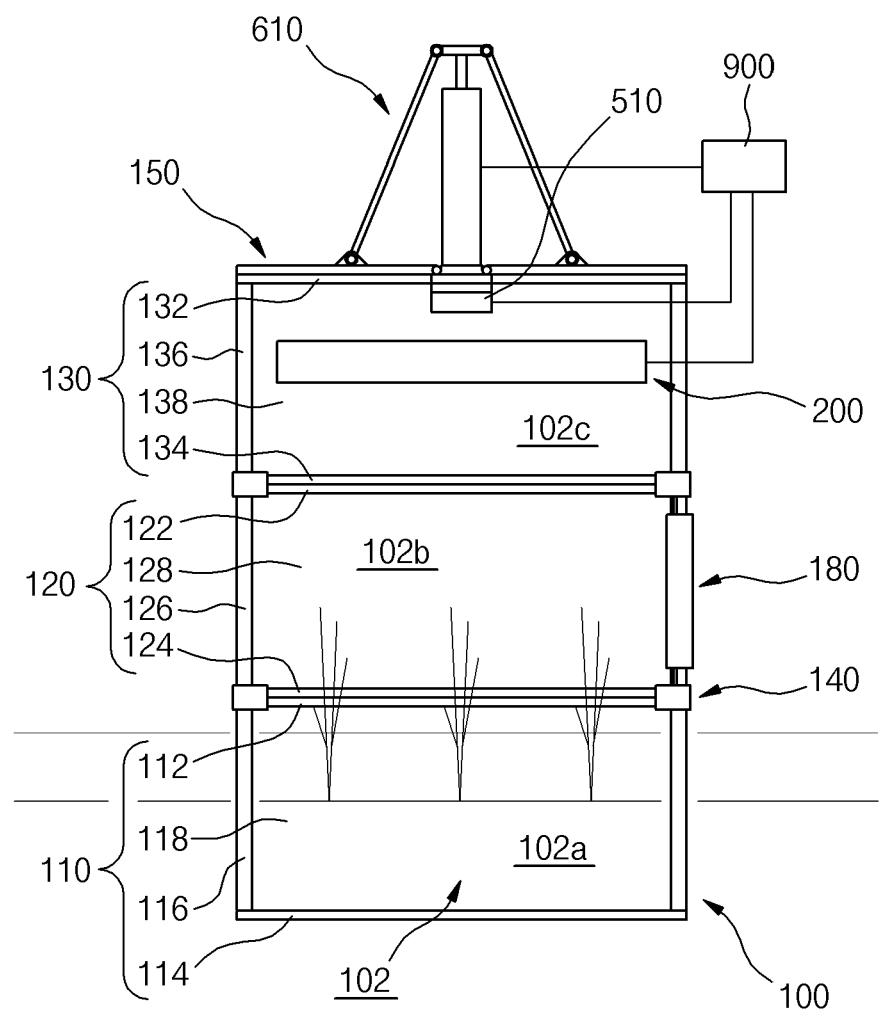
[FIG. 8]

TEMPERATURE CONTROL SYSTEM OF A RICE PADDY METHANE FLUX COLLECTING DEVICE

RELATED APPLICATIONS

This application claims priority to Korean Patent Application 10-2020-0069726, filed on Jun. 9, 2020 in the Korean Intellectual Property Office, the entire disclosure of which is incorporated herein by reference.

BACKGROUND OF THE INVENTION

1. Field of the Invention

The present disclosure relates to a temperature control system, and more specifically, to a temperature control system of a rice paddy methane flux collecting device which may precisely control an anthropogenic environment similar to a natural environmental state, thus to improve effectiveness of a methane flux sample generated in a rice field.

2. Description of the Related Art

In general, various pollutants are discharged from factories, homes, automobiles, etc., and are diffused into the air, thereby causing air pollution. Such air pollution adversely affects human health and emotional life, threatens survival of living things, and may even cause meteorological changes.

Recently, with the ongoing acceleration of industrialization, air pollution is becoming more and more serious. Therefore, countries around the world are striving to prevent air pollution by monitoring, managing, and supervising the state of air pollution through measuring the degree of air pollution.

In this regard, in order to collect a gas sample generated from an object or plant to be subjected to monitoring, as described in Korean Patent Registration No. 10-0499726, there is a technique disclosed in the art for collecting a sample using a difference among a vacuum pressure in a chamber, an internal pressure of a sample collecting bag installed inside the chamber, and atmospheric pressure.

However, since each substance contained in the gas inside the chamber is not uniformly distributed, there is a problem in that reliability is decreased.

In particular, for a rice paddy methane flux, the methane flux should be collected in the natural state. However, since the gas is collected in an artificial environment by the chamber, there is a significant difference from the gas temperature in the natural state.

Accordingly, there is an urgent need to develop a technique capable of collecting samples by creating an artificial environment as similar as possible to the natural environment by maintaining the temperature inside the chamber within a prescribed range with regards to the temperature outside the chamber.

SUMMARY OF THE INVENTION

Accordingly, in consideration of the above-mentioned circumstances, it is an object of the present invention to provide a temperature control system of a rice paddy methane flux collecting device, which includes: a chamber body which has a collecting space formed therein and is opened in a vertical direction, and is installed so that a certain number of rice grains are located; a chamber door configured to open and close an upper side of the collecting space; a collecting unit configured to collect a sample gas in the collecting space; a heating unit configured to increase a temperature in the collecting space; a cooling unit configured to decrease the temperature in the collecting space; a circulation unit configured to circulate the gas in the collecting space; a ventilation unit configured to ventilate the collecting space; an external temperature sensor configured to measure an external temperature outside the chamber body; an internal temperature sensor configured to measure the temperature in the collecting space of the chamber body; and a temperature controller configured to receive signals from the external temperature sensor and internal temperature sensor to control one or more of the heating unit, the cooling unit, the circulation unit, and the ventilation unit based on the received signals so as to maintain the temperature in the collecting space to be equal to the external temperature, wherein the temperature in the collecting space is maintained equal to the external temperature by the temperature controller before collecting the sample gas by the collecting unit, such that the sample gas of the natural environment state is collected in an artificial environment which is the same as the natural environment to improve effectiveness of the sample.

To achieve the above-described object, according to an aspect of the present invention, there is provided a temperature control system of a rice paddy methane flux collecting device, which includes: a chamber body which has a collecting space formed therein and is opened in a vertical direction, and is installed so that a certain number of rice grains are located; a chamber door configured to open and close an upper side of the collecting space; a collecting unit configured to collect a sample gas in the collecting space; a heating unit configured to increase a temperature in the collecting space; a cooling unit configured to decrease the temperature in the collecting space; a circulation unit configured to circulate the gas in the collecting space; a ventilation unit configured to ventilate the collecting space; an external temperature sensor configured to measure an external temperature outside the chamber body; an internal temperature sensor configured to measure the temperature in the collecting space of the chamber body; and a temperature controller configured to receive signals from the external temperature sensor and internal temperature sensor to control one or more of the heating unit, the cooling unit, the circulation unit, and the ventilation unit based on the received signals so as to maintain the temperature in the collecting space to be equal to the external temperature, and control the collecting unit, wherein the temperature in the collecting space is maintained equal to the external temperature by the temperature controller before collecting the sample gas by the collecting unit, such that the sample gas of the natural environment state is collected in an artificial environment which is the same as the natural environment.

Preferably, the chamber door includes: a door base frame provided across a middle of an upper end of the chamber body; a first chamber door pivotally provided at one end of the door base frame to open and close one portion of the collecting space divided by the door base frame; and a second chamber door pivotally provided at the other end of the door base frame to open and close the other portion of the collecting space divided by the door base frame.

In addition, the collecting unit includes: collecting unit bodies having collecting ports which have an opened lower side and are formed so that a cross-sectional area thereof is increased toward the lower side, respectively; filter units provided in the collecting ports of the collecting unit bodies to filter dust contained in the sucked in gas; a mixing storage tank configured to collect and mix the gas collected from each collecting unit body; a suction pipe which connects the collecting port of each collecting unit body and the mixing storage tank to be communicated with each other; and a suction pump configured to suck the gas in the collecting space through the collecting port of each collecting unit body.

In addition, the system further includes a washing unit configured to wash the collecting unit.

Further, the washing unit includes: a washing tank with a washing gas contained therein; a washing pipe which connects the washing tank and the suction pipe; a washing pump configured to supply the washing gas contained in the washing tank to the washing pipe and discharge to the collecting port of each of the collecting unit bodies; a washing valve configured to close the washing pipe or communicate with the suction pipe, and close the suction pipe and the mixing storage tank; and a washing temperature controller configured to control the washing valve by receiving a signal for operating the washing pump so as to discharge the washing gas to the collecting port to wash the collecting port and the filter unit.

In addition, the washing unit further includes vibration units configured to vibrate the collecting unit body to separate foreign matters caught in the collecting port and the filter unit.

Further, the vibration unit generates vibration by generated sound pressure.

In addition, the heating unit and the cooling unit are thermoelectric elements.

Further, the circulation unit includes a circulation fan provided in the door base frame to circulate the gas in the collecting space by an electric power applied thereto.

In addition, the circulation fan further includes a circulation accelerator configured to suck air from the collecting space at a central portion of a lower end and blow the gas along an inner circumferential surface of the chamber body by discharging it in a lateral direction, and allow the gas blown along the inner circumferential surface of the chamber body to pass downward to be accelerated.

Further, the circulation accelerator includes: circulation accelerator bodies provided along the inner circumferential surface of the chamber body; circulation acceleration fans provided inside the circulation accelerator bodies to blow air during rotation; circulation accelerator inlets provided in the circulation accelerator bodies to allow the gas discharged from the circulation fan to be sucked; and circulation accelerator outlets from which the gas accelerated by the circulation acceleration fans is discharged downward.

Further, the ventilation unit includes: a door driving unit configured to operate the chamber doors; and a plurality of ventilation fans provided along a lower end portion of the chamber body to discharge the gas in the collecting space by an electric power applied thereto, wherein the ventilation fan rotates in a direction opposite to the rotational direction of the circulation fan during operation, so as to suck an outdoor air located on an upper side of the open collecting space and discharge it in a lower lateral direction.

Furthermore, the door driving unit includes: a door moving frame located above the door base frame; a door driving cylinder provided on the door base frame to move the door moving frame in a vertical direction; and door driving links whose one end is pivotally connected to the door moving frame, and the other end is pivotally connected to each upper door, wherein when the door moving frame is moved upward by the door driving cylinder, each door driving link is moved upward, and each upper door is pivoted upward to open the collecting space, and when the door moving frame is moved downward by the door driving cylinder, each door driving link is moved downward, and each upper door is pivoted downward to close the collecting space.

In addition, the temperature controller includes: a signal receiver configured to receive a signal from the internal temperature sensor and a signal from the external temperature sensor; a temperature comparator configured to determine a temperature difference by comparing the respective signals received from the signal receiver; a control signal generator configured to generate a control signal for at least one of the heating unit and the cooling unit, when the temperature difference determined by the temperature comparator is out of a prescribed range; and a signal transmitter configured to transmit the control signal generated by the control signal generator to at least one of the heating unit and the cooling unit.

As described above, according to the temperature control system of a rice paddy methane flux collecting device of the present disclosure, the temperature in the collecting space is maintained equal to the external temperature by the temperature controller before collecting the sample gas by the collecting unit, such that the sample gas of the natural environment state is collected in an artificial environment which is the same as the natural environment to improve effectiveness of the sample. Therefore, it is a very useful and effective invention.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view illustrating a temperature control system of a rice paddy methane flux collecting device according to the present disclosure;

FIG. 2 is a view illustrating a chamber door according to the present disclosure;

FIG. 3 is a view illustrating a collecting unit according to the present disclosure;

FIG. 4 is a view illustrating a temperature controller according to the present disclosure;

FIG. 5 is a view illustrating a chamber body according to another embodiment of the present disclosure;

FIG. 6 is a view illustrating a body connector according to the present disclosure;

FIG. 7 is a view illustrating a collecting unit according to another embodiment of the present disclosure; and FIG. 8 is a view illustrating a state of further including a side door according to the present disclosure.

DETAILED DESCRIPTION OF THE INVENTION

Hereinafter, preferred embodiments according to the present invention will be described in detail with reference to the accompanying drawings. The detailed description to be described below with reference to the accompanying drawings is intended to illustrate exemplary embodiments of the invention and is not intended to represent the only embodiment in which the invention may be executed. The following detailed description includes specific details in order to provide a complete understanding of the present invention.

However, those skilled in the art will appreciate that the present invention may be executed without these specific details.

In some cases, well-known structures and devices will not be described or will be illustrated in a block diagram form centering on core functions of each structure and apparatus, to avoid obscuring concepts of the present invention.

Throughout the specification, when the explanatory phrase a part "comprises or includes" a component is used, this means that the part may further include the component without excluding other components, so long as special explanation is not given. Further, the term "unit" described in the specification means a unit for processing at least one function or operation. In addition, as used herein the context for describing the present invention (particularly, in the context of the following claims), the singular forms "a," "an," "one" and "the" are intended to include the plural forms as well, unless the context clearly indicates otherwise in the specification or is clearly limited by the context.

In description of preferred embodiments of the present invention, the publicly known functions and configurations that are judged to be able to make the purport of the present invention unnecessarily obscure will not be described in detail. Further, wordings to be described below are defined in consideration of the functions of the present invention, and may differ depending on the intentions of a user or an operator or custom. Accordingly, such wordings should be defined on the basis of the contents of the overall specification.

Hereinafter, preferred embodiments of the present invention will be described with reference to the accompanying drawings.

As shown in the drawings, a temperature control system of a rice paddy methane flux collecting device includes a chamber body 100, a chamber door 150, a collecting unit 200, a heating unit 300, a cooling unit 400, a circulation unit 500, a ventilation unit 600, an external temperature sensor 700, an internal temperature sensor 800 and temperature controller 900.

The chamber body 100 has an inner collecting space 102 opened in a vertical direction, and is installed so that a certain number of rice grains are located.

In addition, the chamber door 150 is provided at an upper end of the chamber body 100 to open and close an upper side of the collecting space 102.

A plurality of collecting units 200 are provided in the chamber body 100 to collect a sample gas in the collecting space 102.

In addition, the heating unit 300 is provided to increase a temperature in the collecting space 102.

The cooling unit 400 is provided to decrease the temperature in the collecting space 102.

Herein, the heating unit 300 and the cooling unit 400 are, for example, a plurality of thermoelectric elements which are alternately arranged on an inner circumferential surface of the chamber body 100, and can effectively control the temperature in the collecting space 102.

In addition, the circulation unit 500 is provided to circulate the gas in the collecting space 102.

The ventilation unit 600 is provided to ventilate the collecting space 102.

In addition, the external temperature sensor 700 is provided to measure an external temperature outside the chamber body 100.

The internal temperature sensor 800 is provided to measure the temperature in the collecting space 102 of the chamber body 100.

In addition, the temperature controller 900 receives signals from the external temperature sensor 700 and the internal temperature sensor 800 to control one or more of the heating unit 300, the cooling unit 400, the circulation unit 500, and the ventilation unit 600 based on the received signals so as to maintain the temperature in the collecting space 102 equal to the external temperature.

According to the temperature control system of such a rice paddy methane flux collecting device, the temperature in the collecting space 102 is maintained equal to the external temperature by the temperature controller 900 before collecting the sample gas by the collecting unit 200, such that the sample gas of the natural environment state is collected in an artificial environment which is the same as the natural environment.

Of course, maintaining the temperature in the collecting space 102 equal to the external temperature means that the temperature in the collecting space 102 is maintained within a preset allowable error range, that is, within a range of ±1° C., for example.

In other words, when a difference between the temperature of the collecting space 102 and the external temperature is less than −1° C., the temperature controller 900 controls the heating unit 300 to increase the temperature in the collecting space 102, and when the difference exceeds +1° C., the temperature controller 900 controls the cooling unit 400 to decrease the temperature in the collecting space 102.

Herein, as shown in FIG. 2, the chamber door 150 includes a door base frame 152, a first chamber door 154 and a second chamber door 156.

The door base frame 152 is provided across a middle of the upper end of the chamber body 100.

Further, the first chamber door 154 is pivotally provided at one end of the door base frame 152 to open and close one portion of the collecting space 102 divided by the door base frame 152.

The second chamber door 156 is pivotally provided at the other end of the door base frame 152 to open and close the other portion of the collecting space 102 divided by the door base frame 152.

As shown in FIG. 3, the collecting unit 200 includes collecting unit bodies 232, filter units 240, a mixing storage tank 234, a suction pipe 236 and a suction pump 238.

In addition, the system is provided with a plurality of collecting unit bodies 232 having collecting ports 233 which have an opened lower side and are formed so that a cross-sectional area thereof is increased toward the lower side, respectively.

The filter unit 240 is provided in the collecting port 233 of the collecting unit body 232 to filter dust contained in the sucked in gas.

In addition, the mixing storage tank 234 is provided to collect and mix the gas collected from each collecting unit body 232.

The suction pipe 236 communicates the collecting port 233 of each collecting unit body 232 with the mixing storage tank 234.

In addition, the suction pump 238 is provided to suck the gas of the collecting space 102 through the collecting port 233 of each collecting unit body 232.

According to this collecting unit 200, by filtering the gas collected by the collecting unit body 232, it is possible to prevent foreign matters from being collected together.

In addition, the collecting unit 200 further includes a washing unit 250.

This washing unit 250 is configured to wash the collecting unit 200, and specifically wash the collecting unit body 232 and the filter unit 240.

The washing unit 250 includes a washing tank 251, a washing pipe 252, a washing pump 253, a washing valve 254 and a washing controller 255.

The washing tank 251 stores a washing gas therein.

In addition, the washing pipe 252 connects the washing tank 251 and the suction pipe 236.

The washing pump 253 is provided to supply the washing gas contained in the washing tank 251 to each collecting unit body 232 via the washing pipe 252 and discharge it to the collecting port 233.

In addition, the washing valve 254 is configured to close or open the washing pipe 252 so as to be communicated with the suction pipe 236, and close the suction pipe 236 and the mixing storage tank 234.

The washing controller 255 receives an operation signal of the washing pump 253 and controls the washing valve 254, thereby discharging the washing gas to the collecting port 233 to wash the collecting port 233 and the filter unit 240.

Further, the washing unit 250 further includes a vibration unit 256.

The vibration unit 256 is provided to vibrate the collecting unit body 232 to separate foreign matters caught in the collecting port 233 and the filter unit 240.

As an example, the vibration unit 256 generates vibration by a sound pressure or ultrasonic waves generated therein, and allows the foreign matters caught in the filter unit 240 to be separated together with the washing gas, thereby improving a washing efficiency.

Further, the circulation unit 500 includes a circulation fan 510 provided in the door base frame 152 to circulate the gas in the collecting space 102 by an electric power applied thereto.

The circulation fan 510 is configured to suck air in the collecting space 102 and discharge it in a lateral direction from a lower central portion to blow the gas along the inner circumferential surface of the chamber body 100. The gas blown along the inner circumferential surface is circulated upward through the central portion on which the rice is located, thereby uniformly mixing the gas in the collecting space 102.

Herein, the system further includes a circulation accelerator 520 for accelerating and sending the gas blown along the inner circumferential surface of the chamber body 100 downward.

The circulation accelerator 520 includes circulation accelerator bodies 522, circulation acceleration fans 524, circulation accelerator inlets 526 and circulation accelerator outlets 528.

The circulation accelerator bodies 522 are provided along the inner circumferential surface of the chamber body 100.

In addition, the circulation acceleration fans 524 are provided inside the circulation accelerator body 522 to blow air during rotation.

The circulation accelerator inlet 526 is provided in the circulation accelerator body 522 so that the gas discharged from the circulation fan 510 is sucked.

In addition, the circulation accelerator outlet 528 is provided in the circulation accelerator body 522 so that the gas accelerated by the circulation acceleration fan 524 is discharged downward.

Further, the ventilation unit 600 includes a door driving unit 610 and ventilation fans 620.

The door driving unit 610 is provided to operate the chamber door 150.

In addition, a plurality of ventilation fans 620 provided along the lower end portion of the chamber body 100 discharge the gas from the collecting space 102 by the electric power applied thereto.

When reviewing an operation state of the ventilation unit 600, the ventilation fan 620 rotates in a direction opposite to the rotational direction of the circulation fan 510 during operation, thereby sucking the outdoor air located at the upper side of the open collecting space 102 and discharging it downward.

Thereby, it is possible to prevent a concentration of methane from being increased due to methane generated by other rice in the vicinity and entered in the collecting space 102, and introduce the outdoor air located on the upper side to be ventilated.

Herein, the door driving unit 610 includes a door moving frame 612, a door driving cylinder 614 and door driving links 616.

The door moving frame 612 is located above the door base frame 152.

In addition, the door driving cylinder 614 is provided in the door base frame 152 to move the door moving frame 612 in the vertical direction.

One end of the door driving link 616 is pivotally connected to the door moving frame 612, and the other end is pivotally connected to each of the chamber doors 154 and 156.

These door driving links 616 are connected to the first chamber door 154 and the second chamber door 156, respectively.

If reviewing the operation state of the door driving unit 610, when the door moving frame 612 is moved upward by the door driving cylinder 614, each door driving link 616 is moved upward, such that the first chamber door 154 and the second chamber door 156 are pivoted upward to open the collecting space 102.

Conversely, when the door moving frame 612 is moved downward by the door driving cylinder 614, each door driving link 616 is moved downward, such that the first chamber door 154 and the second chamber door 156 are pivoted downward to close the collecting space 102.

Thereby, since a ventilation time can be controlled more precisely than the conventional system, it is possible to improve effectiveness of the sample to be collected.

In addition, as shown in FIG. 4, the temperature controller 900 includes a signal receiver 910, a temperature comparator 920, a control signal generator 930 and a signal transmitter 940.

The signal receiver 910 receives a signal from the internal temperature sensor 800 and a signal from the external temperature sensor 700.

In addition, the temperature comparator 920 compares the respective signals received by the signal receiver 910 to determine a temperature difference.

The control signal generator 930 generates a signal for controlling one or more of the heating unit 300 and the cooling unit 400, when the temperature difference determined by the temperature comparator 920 is out of a prescribed range.

Then, the signal transmitter 940 transmits the control signal generated by the control signal generator 930 to one or more of the heating unit 300 and the cooling unit 400.

Thereby, by controlling the temperature in the collecting space 102 within a prescribed range based on the difference with the external temperature, it is possible to improve the effectiveness of the sample by collecting the sample in a gaseous state in the artificial environment equal to the natural environment.

Of course, the signal receiver 910 and the signal transmitter 940 may also function to receive and transmit signals with other components.

Further, as shown in FIG. 5, the collecting space 102 includes a lower collecting space 102a, a middle collecting space 102b, and an upper collecting space 102c.

In addition, the chamber body 100 includes a first stage body 110, a second stage body 120, a third stage body 130, and body connectors 140.

The first stage body 110 has the lower collecting space 102a therein, and is installed on the area where plants to be sampled are grown.

In addition, the second stage body 120 has the middle collecting space 102b therein, and is provided on the upper side of the first stage body 110.

The third stage body 130 has an upper collecting space 102c therein, and is provided on the upper side of the second stage body 120.

In addition, the body connectors 140 connect the first stage body 110, the second stage body 120 and the third stage body 130 with each other.

Each of these stage bodies 110, 120 and 130 includes upper frames 112, 122 and 132, lower frames 114, 124 and 134, vertical frames 116, 126 and 136, and panels 118, 128 and 138.

The upper frames 112, 122 and 132 form upper portions of the respective collecting spaces 102a, 112b and 112c.

In addition, the lower frames 114, 124 and 134 are installed to be spaced apart from each other at a prescribed interval on the lower side of the upper frames 112, 122 and 132 to form lower portions of the respective collecting spaces 102a, 112b and 112c.

The vertical frames 116, 126 and 136 connect corners of the respective upper frames 112, 122 and 132 and the respective lower frames 114, 124 and 134.

In addition, the panels 118, 128 and 138 are provided between the upper frames 112, 122 and 132, the lower frames 114, 124 and 134, and the vertical frames 116, 126 and 136 to form side faces of the respective collecting spaces 102a, 112b and 112c.

Herein, as shown in FIG. 6, the body connector 140 includes a first engaging notch 142, a second engaging notch 144, and a connection clip 146.

The first engaging notch 142 is formed on the lower side of the upper frames 112, 122 and 132 of any one of the stage bodies 110, 120 and 130.

In addition, the second engaging notch 144 is formed on the upper side of the lower frame 124 of the other stage body 120 located on the upper side of any one stage body 110.

The connection clip 146 has elasticity, and includes engaging protrusions 1462 and 1464 formed at both ends to be engaged to the first engaging notch 142 and the second engaging notch 144, respectively.

Specifically, the connection clip 146 includes a first engaging protrusion 1462, a second engaging protrusion 1464, and a clip body 1466.

The first engaging protrusion 1462 is provided to be engaged to the first engaging notch 142.

In addition, the second engaging protrusion 1464 is provided to be engaged to the second engaging notch 144.

The clip body 1466 has a lower end continued to the first engaging protrusion 1462, and an upper end continued to the second engaging protrusion 1464 to cover outer sides of the upper frames 112, 122 and 132, and the lower frames 114, 124 and 134.

These clip bodies 1466 are formed in a straight shape so as to contact the outer surfaces of the upper frame and the lower frame.

Meanwhile, the clip body 1466 includes a first clip body 1466a and a second clip body 1466b.

The first clip body 1466a is continued to the first engaging protrusion 1462, and is formed to be inclined outward to the upper side.

In addition, the second clip body 1466b is continued to the second engaging protrusion 1464, and is inclined outward to the lower side to be connected to the first clip body 1466a.

These clip bodies 1466 of each embodiment further include a clip operation part 148.

The clip operation part 148 is provided to deform one or more of the upper end and the lower end of the clip body 1466 of each embodiment to be deformed in directions opposite to each other.

The clip operation part 148 protrudes from the outside of one or more of the lower and upper ends of the clip body 1466.

When an operator grips the protruding clip operation part 148 and deforms the clip body 1466, the engaging protrusions 1462 and 1464 may be inserted into or detached from the corresponding engaging notches 142 and 144.

In addition, the system further includes a sealing unit 170 for sealing between the upper frame 112 and the lower frame 124 of the two adjacent stage bodies 110 and 120.

This sealing unit 170 includes a first seal seat 172, a second seal seat 174, and a seal 176.

The first seal seat 172 is formed on the lower sides of the lower frames 114, 124 and 134 of the stage bodies 110, 120 and 130.

In addition, the second seal seat 174 is formed on the upper sides of the upper frames 112, 122, and 132 of the stage bodies 110, 120, and 130 to face the first seal seat 172.

The seal 176 is inserted into the first seal seat 172 and the second seal seat 174.

In addition, as shown in FIG. 7, the collecting unit 200 includes a first collecting unit 210, a second collecting unit 220, and a third collecting unit 230.

The first collecting unit 210 is provided in the first stage body 110 to collect a sample gas in the lower collecting space 102a.

In addition, the second collecting unit 220 is provided in the second stage body 120 to collect a sample gas in the middle collecting space 102b.

The third collecting unit 230 is provided in the third stage body 130 to collect a sample gas in the upper collecting space 102c.

Each of the first collecting unit 210, the second collecting unit 220, and the third collecting unit 230 includes collecting unit bodies 212, 222 and 232, mixing storage tanks 214, 224 and 234, suction pipes 216, 226 and 236, and suction pumps 218, 228 and 238, which are the same as those shown in FIG. 3.

Herein, the first collecting unit 210, the second collecting unit 220, and the third collecting unit 230 have the same configuration as each other, and thus the third collecting unit 230 will be described as a representative.

The collecting unit bodies 232 have a plurality of collecting ports 233 which have an opened lower side and are formed so that a cross-sectional area thereof is increased toward the lower side, respectively.

In addition, the mixing storage tank 234 is provided to collect and mix the gas collected from the collecting unit body 232.

The suction pipe 236 is provided to connect the collecting port 233 of the collecting unit body 232 and the mixing storage tank 234 to be communicated with each other.

In addition, the suction pump 238 is provided to suck the gas in the collecting space 102 through the collecting port 233 of the collecting unit body 232.

Herein, each of the collecting units 210, 220 and 230 is provided with the filter unit 240.

The filter unit 240 is provided in the collecting port 233 of the collecting unit body 232 to filter dust contained in the sucked in gas.

In addition, before collecting the gas by the collecting unit 200, the gas in the collecting space 102 is circulated by the circulation unit 500.

The temperature controller 900 controls the circulation unit 500 to circulate the gas in the collecting space 102 one to three minutes before collecting the sample gas by the collecting unit 200.

Thereby, as respective substances contained in the gas of the collecting space 102 is uniformly distributed throughout, the effectiveness of the sample may be improved.

In addition, the temperature controller 900 controls one or more of the first collecting unit 210, the second collecting unit 220, and the third collecting unit 230 to collect the sample gases, respectively.

Thereby, the sample gases of the lower collecting space 102a, the middle collecting space 102b, and the upper collecting space 102c may be collected, respectively, such that the sample gases may be collected by height.

In addition, the temperature controller 900 controls the door driving unit 610 to open and close the chamber doors 154 and 156 at an interval of 25 to 35 minutes, for example.

Thereby, by ventilating the collecting space 102, it is possible to prevent defective samples from being collected.

Further, as shown in FIG. 8, the chamber body 100 further includes side doors 180.

At least one or more side doors 180 provided on the side faces of the chamber body 100 open and close the collecting space 102 in the lateral direction.

Thereby, outdoor air may be introduced or discharged in the lateral direction, and the collecting unit 200 located in the collecting space 102 may be managed.

Of course, the side door 180 may be pivoted by a hinge, slid along a rail, or automatically opened and closed by a motor and a cylinder.

DESCRIPTION OF REFERENCE NUMERALS

100: Chamber body
150: Chamber door
200: Collecting unit
300: Heating unit
400: Cooling unit
500: Circulation unit
600: Ventilation unit
700: External temperature sensor
800: Internal temperature sensor
900: temperature controller

What is claimed is:

1. A temperature control system of a rice paddy methane flux collecting device, comprising:
a chamber body which has a collecting space formed therein and is opened in a vertical direction, and is installed so that a certain number of rice grains are located in the chamber body;
a chamber door configured to open and close an upper side of the collecting space;
a collecting unit configured to collect a sample gas in the collecting space;
a heating unit configured to increase a temperature in the collecting space;
a cooling unit configured to decrease the temperature in the collecting space;
a circulation unit configured to circulate the gas in the collecting space;
a ventilation unit configured to ventilate the collecting space;
an external temperature sensor configured to measure an external temperature outside the chamber body;
an internal temperature sensor configured to measure the temperature in the collecting space of the chamber body; and
a temperature controller configured to receive signals from the external temperature sensor and internal temperature sensor to control one or more of the heating unit, the cooling unit, the circulation unit, and the ventilation unit based on the received signals so as to maintain the temperature in the collecting space to be equal to the external temperature,
wherein the temperature in the collecting space is maintained equal to the external temperature by the temperature controller before collecting the sample gas by the collecting unit, such that the sample gas of the natural environment state is collected in an artificial environment which is the same as the natural environment, and
wherein the chamber door comprises:
a door base frame provided across a middle of an upper end of the chamber body;
a first chamber door pivotally provided at one end of the door base frame to open and close one portion of the collecting space divided by the door base frame; and
a second chamber door pivotally provided at the other end of the door base frame to open and close the other portion of the collecting space divided by the door base frame.

2. The temperature control system of a rice paddy methane flux collecting device according to claim 1, wherein the collecting unit comprises:
collecting unit bodies having collecting ports which have an opened lower side and are formed so that a cross-sectional area thereof is increased toward the lower side, respectively;
filter units provided in the collecting ports of the collecting unit bodies to filter dust contained in sucked in gas;
a mixing storage tank configured to collect and mix gas collected from each collecting unit body;
a suction pipe which connects the collecting port of each collecting unit body and the mixing storage tank to be communicated with each other;
a suction pump configured to suck the gas in the collecting space through the collecting port of each collecting unit body.

3. The temperature control system of a rice paddy methane flux collecting device according to claim 2, further comprising a washing unit configured to wash the collecting unit.

4. The temperature control system of a rice paddy methane flux collecting device according to claim 1, wherein the heating unit and the cooling unit are thermoelectric elements.

5. The temperature control system of a rice paddy methane flux collecting device according to claim 1, wherein the circulation unit comprises a circulation fan provided in the door base frame to circulate the gas in the collecting space by an electric power applied thereto.

6. The temperature control system of a rice paddy methane flux collecting device according to claim 5, wherein the ventilation unit comprises:
a door driving unit configured to operate the chamber doors; and
ventilation fans provided along a lower end portion of the chamber body to discharge the gas in the collecting space by an electric power applied thereto,
wherein the ventilation fans rotate in a direction opposite to the rotational direction of the circulation fan during operation, so as to suck an outdoor air located on an upper side of an open collecting space and discharge the sucked outdoor air in a lower lateral direction.

7. The temperature control system of a rice paddy methane flux collecting device according to claim 1, the temperature controller comprises:
a signal receiver configured to receive a signal from the internal temperature sensor and a signal from the external temperature sensor;
a temperature comparator configured to determine a temperature difference by comparing the respective signals received from the signal receiver;
a control signal generator configured to generate a control signal for at least one of the heating unit and the cooling unit, when the temperature difference determined by the temperature comparator is out of a prescribed range; and
a signal transmitter configured to transmit the control signal generated by the control signal generator to at least one of the heating unit and the cooling unit.

8. A temperature control system of a rice paddy methane flux collecting device comprising:
a chamber body which has a collecting space formed therein and is opened in a vertical direction, and is installed so that a certain number of rice grains are located in the chamber body;
a chamber door configured to open and close an upper side of the collecting space;
a collecting unit configured to collect a sample gas in the collecting space;
a washing unit configured to wash the collecting unit;
a heating unit configured to increase a temperature in the collecting space;
a cooling unit configured to decrease the temperature in the collecting space;
a circulation unit configured to circulate the gas in the collecting space;
a ventilation unit configured to ventilate the collecting space;
an external temperature sensor configured to measure an external temperature outside the chamber body;
an internal temperature sensor configured to measure the temperature in the collecting space of the chamber body; and
a temperature controller configured to receive signals from the external temperature sensor and internal temperature sensor to control one or more of the heating unit, the cooling unit, the circulation unit, and the ventilation unit based on the received signals so as to maintain the temperature in the collecting space to be equal to the external temperature, and control the collecting unit and washing unit,
wherein the temperature in the collecting space is maintained equal to the external temperature by the temperature controller before collecting the sample gas by the collecting unit, such that the sample gas of the natural environment state is collected in an artificial environment which is the same as the natural environment, and
wherein the chamber door comprises:
a door base frame provided across a middle of an upper end of the chamber body;
a first chamber door pivotally provided at one end of the door base frame to open and close one portion of the collecting space divided by the door base frame; and
a second chamber door pivotally provided at the other end of the door base frame to open and close the other portion of the collecting space divided by the door base frame.

* * * * *